Patented July 23, 1935

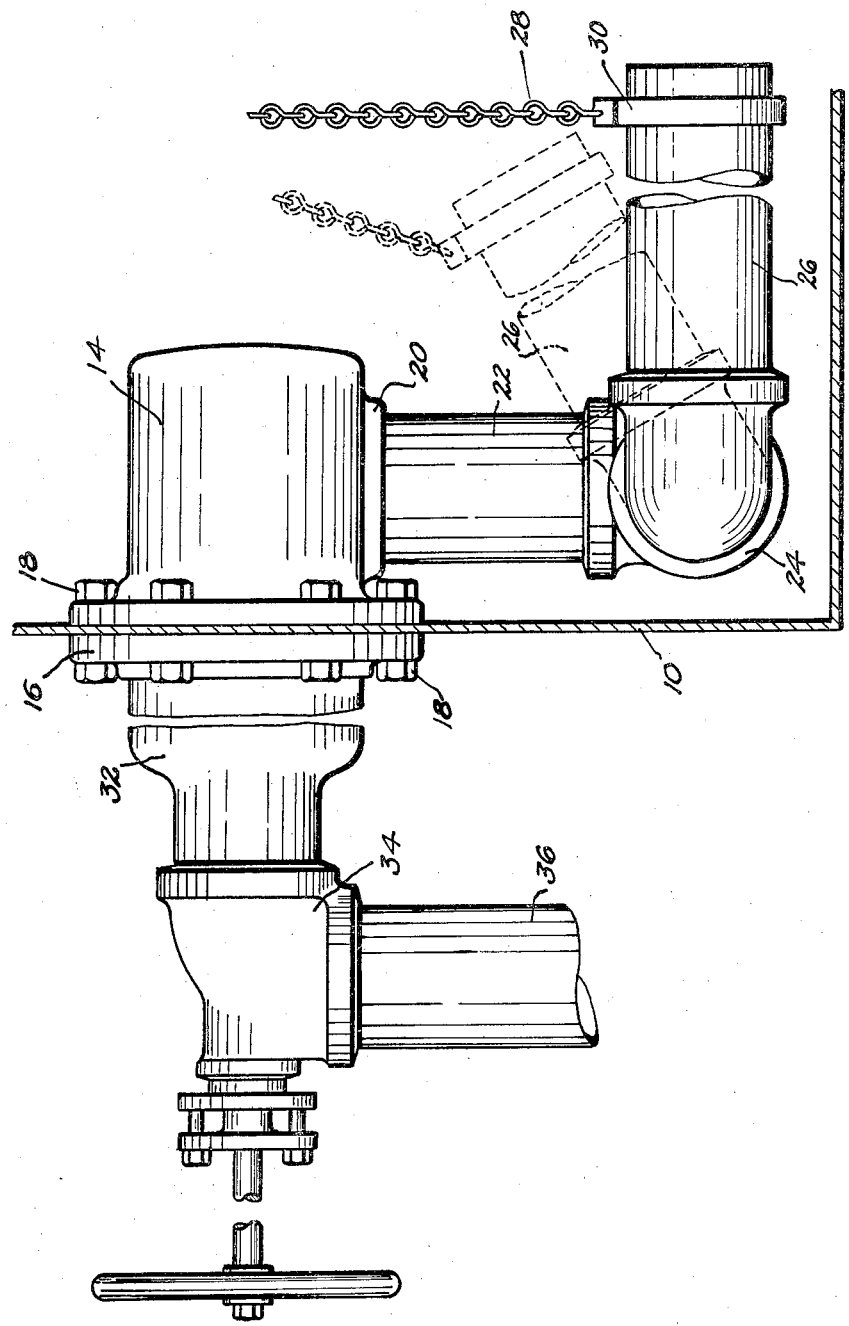

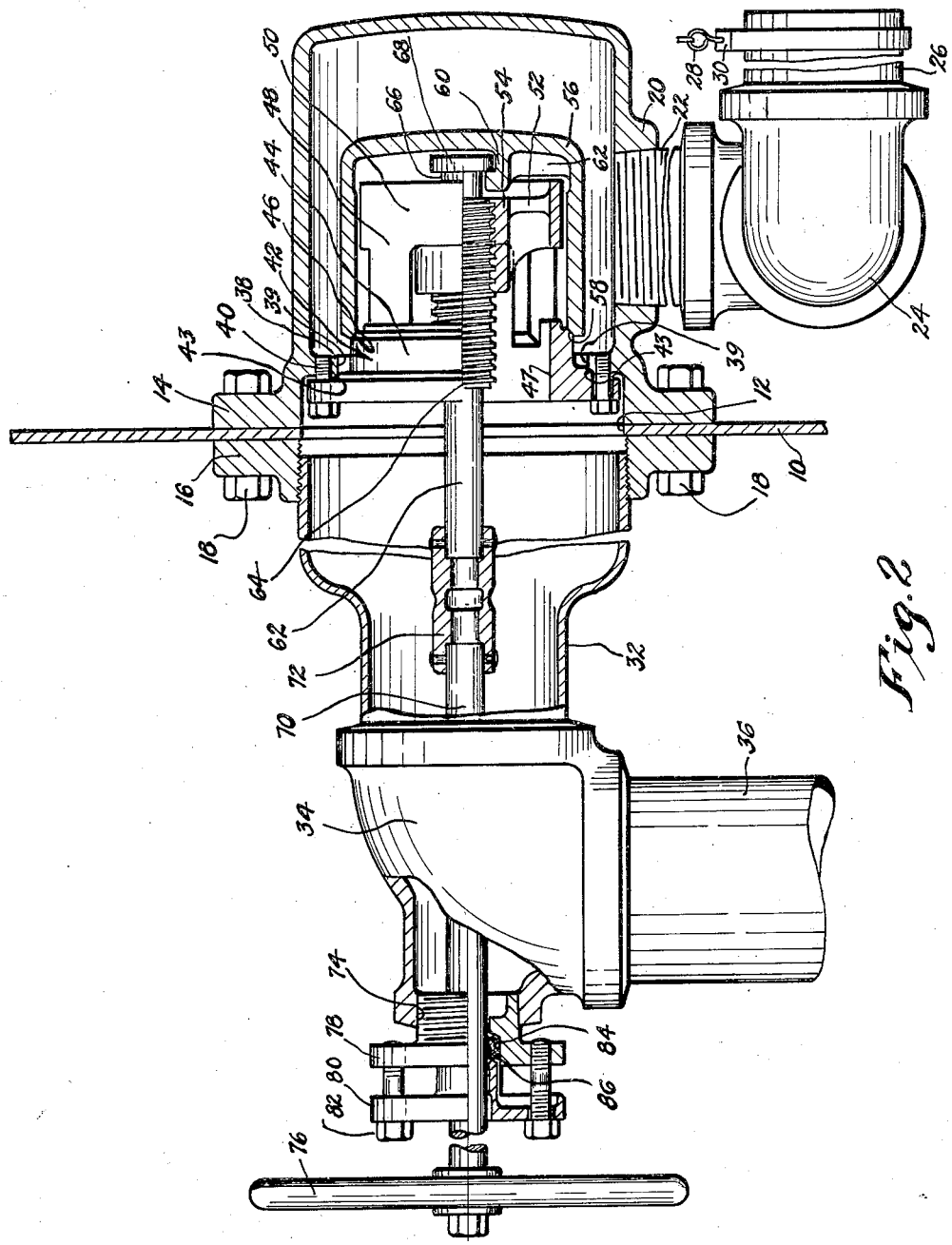

2,009,093

UNITED STATES PATENT OFFICE 2,009,093

VALVE

French H. Morehead, Brookline, Mass., assignor to Walworth Patents Inc., Boston, Mass., a corporation of Massachusetts Application March 17, 1932, Serial No. 599,379

6 Claims. (Cl. 137—21)

This invention relates to valves and more particularly to a draw-off valve for liquid storage tanks and the like.

Draw-off valves for liquid storage tanks, refining stills, tank cars and the like are often arranged so that the valve structure itself is protected from injury by being housed within the storage tank, the operating handle and outlet pipe being the only parts visible from the exterior of the tank.

Such a construction, while protecting the valve from injury, renders the valve structure inaccessible and this is extremely disadvantageous when it is necessary to make repairs to the valve. The only method of gaining access to the valve in such arrangements is by emptying the tank and ventilating it to permit workmen to enter. The lack of comparatively pure air inside the tank often necessitates the use of gas masks by the workmen and the whole operation involves a great deal of time, annoyance and discomfort.

It sometimes happens that due to the hot uncomfortable and confined area in which the workmen operate when cleaning the tank or repairing the valve that portions of clothing, such as overalls, rubber boots and gas masks, are removed while the workmen are in the tank and left therein when the work is completed and the tank refilled. These articles later cause clogging of the valve when attempts are made to operate it, and the tank must again be drained and cleaned before this clogging matter can be removed.

It is, therefore, an object of this invention to permit reseating or other repairs of the valve to be accomplished without the necessity of removing the liquid from the tank.

Another object of the invention is to permit removal of the valve from the tank without loss of liquid therefrom.

Another object of the invention is to facilitate the removal of the valve from the tank and also its rapid replacement when desired.

Another object of the invention is to prevent freezing of the valve by insuring that no liquid will remain therein when the valve is closed.

Another object of the invention is to prevent damage to the valve by enclosing it within the storage tank.

Another object of the invention is to eliminate sticking of the valve upon its seat.

In the accompanying drawings wherein similar reference numerals designate similar parts throughout the several views—

Fig. 1 is a side elevation of a draw-off valve positioned in a tank, a portion of which is shown in section.

Fig. 2 is an enlarged view, partly in section, of the draw-off valve shown in Fig. 1.

Referring more particularly to the drawings, it will be seen that the valve structure is shown as applied to a tank 10 having an orifice 12 formed therein. A closure member 14 is positioned within the tank covering the orifice 12, and on the outside of the tank surrounding the orifice 12 is a flange 16. The flange 16 and closure member 14 may be secured to the tank 10 as by means of the bolts 18. The closure member 14 is provided with a boss 20 positioned at one side thereof, the boss being threaded for the reception of a nipple 22. Attached to the other end of the nipple is a swivel connection 24 carrying a pipe 26 which can be raised and lowered in the tank by means of a chain 28 connected to the pipe 26 as by means of the collar 30. The closure member 14 is adapted to contain a valve structure to be hereinafter described which controls the flow of liquid from the tank 10.

When the valve is opened, as will be hereinafter described, liquid entering the closure member 14 by way of the pipe 26 will flow therefrom through the orifice 12 in the tank and into a nipple connection 32 which threadedly engages the flange 16. An elbow 34 may be threaded on the connection 32 and an outlet pipe 36 be threaded into the elbow 34 and positioned at an angle to the connection 32.

From the foregoing description it will be seen that the closure member 14 containing the valve structure is wholly enclosed within the tank and ordinarily any repairs to be made to the valve would necessitate emptying the tank in order to gain access to the valve. In accordance with my invention means have been provided whereby repairs may be made to the valve without the necessity of removing the liquid from the tank, and such repairs can be made even when the tank is quite full.

Accordingly, the closure member 14 is provided with an internal flange 38 having an opening 39 therethrough. To the flange 38 there may be secured, as by means of the bolts 40, a valve body designated generally by the numeral 42, engaging a beveled outer edge 43 on the flange forming a seat therefor. The valve body 42 is provided adjacent the flange 38 with an annular seating portion 44 having an external seating surface 46 and an internal opening 47. Extending from the seating portion 44 is a series of spaced legs 48 terminating in an annular guide portion 50. The guide portion 50 is provided with internally extending ribs 52 carrying a hub 54 which is threaded on its internal surface.

Movable longitudinally of the valve body 42 is a valve cap member 56 of generally cup-shaped form having a seating surface 58 formed on its open end and adapted to engage the seating surface 46 of the valve body 42. At the closed end of the cup-shaped cap member 56 is a central hook-shaped portion 60 formed integrally with the cap 56 and strengthened by the ribs 62 extending from the side of the cap member 56 to the hook-shaped portion 60.

In accordance with this invention the cap member is made sufficiently small to be freely movable through the opening 39 in the flange 38 to permit removal of the valve structure from the closure member as will be hereinafter apparent.

The valve is opened and closed by longitudinal movement of the cap member. This movement is accomplished by means of a stem 62 having an enlarged threaded portion 64 engaging the threaded hub 54 of the cap member and having a reduced portion 66 defining a head 68 engaging the hook-shaped portion 60 of the cap member. It will be observed that the diameter of the threaded portion 64 of the stem is comparatively small and that the threads are of the "Acme" type. It will be understood that any desired type of threads may be used, but it has been found that with a small diameter of stem relative to the valve cap and coarse threads of the "Acme" type, a relatively small friction is obtained between the threaded surfaces and a relatively large helix angle which reduces the wedging action. There is also no positive rotation of the valve cap when moved to its seat, and due to this and to the small diameter construction of the threads no sticking of the valve upon its seat is encountered.

The threaded valve stem 62 may be connected to an extension stem 70, discrepancies in the alignment of the stems 70 and 62 being compensated for by the use of a coupling 72 therebetween. The stem 70 may extend through an opening 74 in the elbow 34 and be provided with an operating handwheel 76 at its terminal end. Leakage along the stem 70 is prevented from flowing from the elbow 34 by provision of a stuffing box 78 threadedly engaging the opening 74 and having a packing gland 80 adjustably secured thereto as by means of the bolts 82. The stuffing box 78 may in the usual manner be provided with an enlarged opening 84 adapted to contain packing 86 encircling the stem 70 and compressed by means of packing gland 80.

The operation of the device is as follows:—

When the valve is opened and the tank filled the swivel pipe 26 may be lowered below the surface of the liquid in the tank to permit the liquid to flow into the closure member 14, through the spaces between legs 48, and through the opening 47, to be drawn off through the outlet pipe 36. The valve may be closed by rotation of the handwheel 76 to bring the valve cap member 56 with its seating surface 58 into engagement with the seating surface 46 of the valve body 42. No liquid will remain within the valve structure and therefore freezing of the valve will be prevented.

Should the valve member need reseating, or be clogged, a ready means of removal of the valve is provided. This is accomplished by unscrewing the nipple 32 and also the bolts 40 which retain the valve body on flange 38 and the whole valve structure may be removed through the opening 39 in the flange 38. It will be apparent that before the removal of the valve from the closure member 14 the swivel pipe 26 should be raised above the surface of the liquid in the tank and no liquid can then flow into the closure member. When repairs have been effected the valve can be reassembled within the closure member and the swivel pipe 26 lowered to resume the operation of drawing off the liquid. Such removal of the valve structure from the tank is readily accomplished as only a few bolts have to be removed to accomplish such removal.

From the foregoing description it will be seen that all of the objects of the invention have been accomplished in a simple and economical manner and a draw-off valve for liquid storage tanks and the like has been provided wherein no loss of liquid need take place at any time.

I claim:—

1. A draw-off valve for liquid storage tanks and the like having an outlet comprising, a closure member positioned in the tank and covering the outlet, a valve structure positioned in the closure member and removable through the outlet, said valve structure comprising a ported valve body detachably secured to the closure member within the tank and having a seating surface remote from the tank outlet, a valve cap movable into and out of engagement with said seating surface, to control the flow of fluid through said ported valve body, an actuating stem extending through the outlet and threadedly engaging said body and connected to said cap, and means in the tank communicating with the closure member to control the flow of liquid to the valve.

2. A draw-off valve for liquid storage tanks and the like having an outlet comprising, a closure member positioned in the tank and covering the outlet, a valve structure positioned in the closure member, said valve structure comprising a hollow valve body secured to the closure member within the tank and having a seating surface remote from the tank outlet, a perforated extension on the valve body, a valve cap movable into and out of engagement with said seating surface and guided by said extension, and an actuating stem extending through the outlet and threadedly engaging said body and connected to said cap.

3. A draw-off valve for liquid storage tanks and the like having an outlet comprising, a closure member positioned in the tank and covering the outlet, a valve structure positioned in the closure member, said valve structure comprising a hollow valve body secured to the closure member within the tank and having a seating surface remote from the tank outlet, a perforated extension on the valve body, a valve cap movable into and out of engagement with said seating surface and guided by said extension, a threaded internal hub on said body, an actuating stem extending through the outlet and threadedly engaging said hub and connected to said cap, and a handwheel external of the tank for rotating said stem.

4. A draw-off valve for liquid storage tanks and the like having an outlet comprising, a closure member positioned in the tank and covering the outlet, a valve structure positioned in the closure member, said valve structure comprising a hollow valve body secured to the closure member and having a seating surface, a valve cap movable into and out of engagement with said seating surface, an actuating stem threadedly engaging said body, and interlocking means on the stem and cap adapted to permit rotation of the stem without rotation of the cap.

5. A draw-off valve for liquid storage tanks and the like having an outlet comprising, a closure member positioned in the tank and covering the outlet, an annular flange extending from intermediate the ends of said closure member, a valve structure positioned in the closure member and removable through the outlet, said valve structure comprising a hollow valve body secured at one end to said flange and housed wholly within said closure, said valve body having a seating surface remote from the tank outlet, a valve cap movable into and out of engagement with said seating surface, a threaded internal hub on said body adapted to be enclosed by the valve cap, an actuating stem extending through the outlet and threadedly engaging said hub and connected to said cap, and means connected to the closure member for controlling the flow of liquid to said valve.

6. A draw-off valve for liquid storage tanks and the like comprising, a closure member positioned in the tank and covering the outlet, an annular flange extending from intermediate the ends of said closure member, a valve structure positioned in the closure member and operable to control the flow of liquid through the outlet, said valve structure comprising a hollow valve body detachably secured at one end to said flange and housed wholly within the closure member, said body having a seating surface beyond said flange and remote from the tank outlet, spaced legs on said body terminating in an annular guide portion, an internal threaded hub carried by said guide portion, a cup-shaped valve cap movable on the body into engagement with said seating surface, an actuating stem threadedly engaging said hub and connected to said cap, said body, cap and actuating stem being smaller than the outlet and removable from the tank therethrough, and means connected to the closure member for controlling the flow of liquid to said valve.

FRENCH H. MOREHEAD.